(12) United States Patent
Imaoka

(10) Patent No.: US 8,308,238 B2
(45) Date of Patent: Nov. 13, 2012

(54) SEAT DEVICE FOR VEHICLE

(75) Inventor: Naohiro Imaoka, Hiroshima (JP)

(73) Assignee: Mazda Motor Corporation (JP)

( * ) Notice: Subject to any disclaimer, the term of this patent is extended or adjusted under 35 U.S.C. 154(b) by 78 days.

(21) Appl. No.: 12/821,646

(22) Filed: Jun. 23, 2010

(65) Prior Publication Data

US 2011/0006571 A1 Jan. 13, 2011

(30) Foreign Application Priority Data

Jul. 8, 2009 (JP) ................................. 2009-161692

(51) Int. Cl.
*B60N 2/30* (2006.01)
*B60N 2/32* (2006.01)

(52) U.S. Cl. ... 297/236; 297/105; 297/107; 297/188.08; 297/188.09; 297/188.1; 297/233; 297/234; 297/235; 297/248; 297/331; 297/334; 297/350

(58) Field of Classification Search .................. 297/233, 297/248, 105, 107, 188.08, 188.09, 188.1, 297/234, 235, 236, 331, 334, 350
See application file for complete search history.

(56) References Cited

U.S. PATENT DOCUMENTS

| | | | | |
|---|---|---|---|---|
| 2,621,708 A | * | 12/1952 | Luce, Jr. ................... | 297/233 X |
| 5,529,376 A | * | 6/1996 | Jovan et al. ............... | 297/248 X |
| 6,260,924 B1 | * | 7/2001 | Jones et al. ............... | 297/248 X |
| 6,572,188 B2 | * | 6/2003 | Ozawa ........................ | 297/238 |
| 6,811,200 B2 | * | 11/2004 | Shibata et al. ............ | 297/236 X |
| 7,063,390 B2 | * | 6/2006 | Suzuki et al. .............. | 297/483 |
| 7,077,474 B2 | * | 7/2006 | Satani ....................... | 297/233 X |
| 7,490,896 B2 | * | 2/2009 | Smith ........................ | 297/235 |
| 7,823,950 B2 | * | 11/2010 | Toyota et al. ............. | 297/233 X |
| 7,988,229 B2 | * | 8/2011 | Dill et al. ................... | 297/248 |
| 8,020,932 B2 | * | 9/2011 | Yamada et al. ........... | 297/248 X |
| 8,033,604 B2 | * | 10/2011 | Behrens et al. ............ | 297/236 |
| 8,118,359 B2 | * | 2/2012 | Kyogoku et al. ........... | 297/105 |
| 2004/0070243 A1 | * | 4/2004 | Cha .......................... | 297/248 X |
| 2009/0008975 A1 | * | 1/2009 | Behrens et al. ............ | 297/236 |
| 2011/0175411 A1 | * | 7/2011 | Wagner et al. ............ | 297/236 |
| 2012/0139301 A1 | * | 6/2012 | Kyogoku et al. ........... | 297/105 |
| 2012/0146365 A1 | * | 6/2012 | Kyogoku et al. ........... | 297/105 |

FOREIGN PATENT DOCUMENTS

JP 11-129800 5/1999
JP 2004-249782 A 9/2004

\* cited by examiner

*Primary Examiner* — Rodney B White
(74) *Attorney, Agent, or Firm* — Studebaker & Brackett PC; Donald R. Studebaker

(57) ABSTRACT

In a seatbelt device for a sub seat, a retractor to wind up a webbing is attached to a sub-seat back support member. A buckle to detachably hold a tongue provided at the webbing is provided on a side of the sub-seat cushion which is opposite to a disposition side of the main seat in a vehicle width direction. Accordingly, the seat device for a vehicle which can ensure the sufficient sitting rigidity of the sub seat and the proper support rigidity of the retractor can be provided.

7 Claims, 13 Drawing Sheets

SEAT DEVICE FOR VEHICLE

BACKGROUND OF THE INVENTION

The present invention relates to a seat device for a vehicle which comprises a main seat having a main-seat cushion and a main-seat back, and a sub seat having a sub-seat cushion and a sub-seat back, wherein the sub-seat back is supported at the main-seat back via a sub-seat back support member so as to be foldable at the main-seat back.

Conventionally, a seat device for a vehicle which comprises a second-row rear seat having a pair of main seats and a sub seat provided between them is known. Herein, this seat device may provide various seat arrangements, such as a two-passenger mode in which two passengers can be seated serenely in a wide seat space formed by the main seats and the sub seat, a three-passenger mode in which three passengers can be seated in the main seats and the sub seat, a walk-through mode in which the sub seat is stored at either one of the main seats so that a walk-in space can be formed between the second-row seat and a third-row seat, or some use mode in which the sub-seat cushion is used as a container, or the sub-seat back is used as a cup holder.

Meanwhile, in general, the above-described sub seat (assist seat) may be necessary to be made with a light weight because it is foldable at the main seat, and it may not have enough strength to attach a seatbelt for the sub seat. Accordingly, a two-point type of seatbelt for the sub seat is practically provided at the main seat beside the sub seat to restrain the passenger seated in the sub seat. However, it is preferable that a three-point type of seatbelt be provided for the sub seat, and in this case it may be considered that a shoulder anchor to guide the seatbelt for the sub seat is provided on the side of the seat back of the main seat. Herein, since an appearance of the seatbelt in its non-use state may deteriorate and the seat back of the sub seat may be configured not to interference with this shoulder anchor, there was a problem in that any sufficient width-direction space of the seat back of the sub seat could not be ensured.

Japanese Patent Laid-Open Publication No. 2004-249782 discloses the seat device for a vehicle comprising the main seat and the sub seat, in which the seat back of the sub seat is attached to the seat back of the main seat via the horizontal axis so as to rotate in the vehicle longitudinal direction. Further, the seat back of the sub seat is attached to the seat back of the main seat via the vertical axis so as to be folded. Moreover, the seat cushion of the sub seat can provide either its sitting state or its storage state. This publication, however, discloses nothing about a seatbelt device for a sub seat which comprises a webbing, retractor and so on.

Japanese Patent Laid-Open Publication No. 11-129800 discloses the three-point type of seatbelt applied to the sub seat. Herein, while the seat cushion of the sub seat is supported at the seat cushion of the main seat, the seat back of the sub seat is attached to the seat cushion of the sub seat. Accordingly, there was a problem in that the rigidity of the sub seat may be insufficient, so that the sitting feeling would deteriorate. Further, since the shoulder anchor of the seatbelt for the sub seat is attached to the seat back of the main seat, there was the same problem described above.

SUMMARY OF THE INVENTION

An object of the present invention is to provide a seat device for a vehicle which can ensure the sufficient sitting rigidity of the sub seat and the proper support rigidity of the retractor.

According to the present invention, there is provided a seat device for a vehicle, comprising a main seat having a main-seat cushion and a main-seat back, the main-seat back projecting upward from a rear end of the main-seat cushion to support a back of a passenger seated in the main seat, a sub seat having a sub-seat cushion and a sub-seat back, the sub-seat cushion supported at the main seat so as to be storable at a position below the main-seat cushion, the sub-seat back supporting a back of a passenger seated in the sub seat, a sub-seat back support member to support the sub-seat back at the main-seat back so that the sub-seat back is foldable at the main-seat back, and a seatbelt device for a sub seat, the seatbelt device for a sub seat comprising a retractor to wind up a webbing and a buckle to detachably hold a tongue provided at the webbing, wherein the retractor of the seatbelt device for a sub seat is attached to the sub-seat back support member, and the buckle of the seatbelt device for a sub seat is provided on a side of the sub-seat cushion which is opposite to a disposition side of the main seat in a vehicle width direction.

According to the present invention, since the sub-seat cushion is supported at the main seat and the sub-seat back is supported at the main-seat back, the sufficient sitting rigidity of the sub seat can be endured, and thereby the comfortable sitting can be provided. Further, since the retractor of the seatbelt device for the sub seat is attached to the sub-seat back support member, the sufficient support rigidity of the retractor can be ensured. Moreover, the passenger seated in the sub seat can be properly restrained by the webbing when the tongue fixed to the webbing is held by the buckle of the sub-seat cushion.

According to an embodiment of the present invention, a shoulder anchor to guide a middle portion of the webbing of the seatbelt device for a sub seat is attached to an upper portion of the sub-seat back support member which is positioned above the retractor of the seatbelt device for a sub seat. Thereby, since the middle portion of the webbing is guided by the shoulder anchor positioned above the retractor, the passenger seated in the sub seat can be restrained by the three-point type of seatbelt properly without hurting any seat arrangement when the tongue fixed to the webbing is held by the buckle of the sub-seat cushion. Further, by providing the retractor at a position below the shoulder anchor, the retractor having some weight can be properly away from the upper half body of the passenger, so that the safety of the passenger seated in the sub seat can be improved effectively.

According to another embodiment of the present invention, the retractor of the seatbelt device for a sub seat is provided at an upper portion of the sub-seat back support member, an end portion of the webbing extending from the retractor is fixed to the sub-seat back support member at a height position which corresponds to the sub-seat cushion, and the tongue detachably held by the buckle is provided movably at a middle portion of the webbing of the seatbelt device for a sub seat. Thereby, since the end portion of the webbing is fixed to the sub-seat back support member and the tongue is provided movably at the middle portion of the webbing, the passenger seated in the sub seat can be restrained by the three-point type of seatbelt properly when the tongue is held by the buckle. Further, since the retractor is provided at the height position which corresponds to the passenger's shoulder, any too-much longitudinal move of the upper half body of the passenger which may be caused by the vehicle collision can be properly prevented by the lock mechanism of the webbing by the retractor, so that the safety of the passenger seated in the sub seat can be further improved. Further, since the retractor is provided at the sub-seat back support member, the proper support rigidity of the retractor can be ensured.

According to another embodiment of the present invention, the retractor of the seatbelt device for a sub seat is provided at an upper portion of the sub-seat back support member, the tongue is provided movably at a middle portion of the webbing detachably held by the buckle of the seatbelt device for a sub seat, and a fixed tongue detachably held by another buckle which is provided on the other side of the sub-seat cushion which is opposite to a disposition side of the buckle is fixed to an end portion of the webbing. Thereby, the passenger seated in the sub seat can be restrained by the three-point type of seatbelt properly when the tongue fixed to the end portion of the webbing is held by the buckle and then the movable tongue is held by another buckle. Accordingly, the safety of the passenger seated in the sub seat can be improved. Further, since a so-called double tongue constitution is provided, the webbing can be perfectly wound up by and stored in the retractor in a seat arranging, so that the proper seat arrangement can be obtained. Moreover, since the retractor is provided at the sub-seat back support member, the proper support rigidity of the retractor can be ensured.

According to another embodiment of the present invention, the buckle is provided at the sub-seat cushion of the sub seat. Thereby, the buckle can be stored along with the sub-seat cushion below the main-seat cushion, so the proper appearance in a storage state can be provided.

According to another embodiment of the present invention, the sub-seat back support member is supported at a seat-back frame of the main seat. Thereby, the support rigidity of the retractor attached to the sub-seat back support member (or, the retractor and the shoulder anchor) can be further improved, so that the crash from the vehicle collision can be received properly.

Other features, aspects, and advantages of the present invention will become apparent from the following description which refers to the accompanying drawings.

DETAILED DESCRIPTION OF THE INVENTION

Hereinafter, preferred embodiments of the present invention will be described referring to the accompanying drawings.

Embodiment 1

Figure 1:
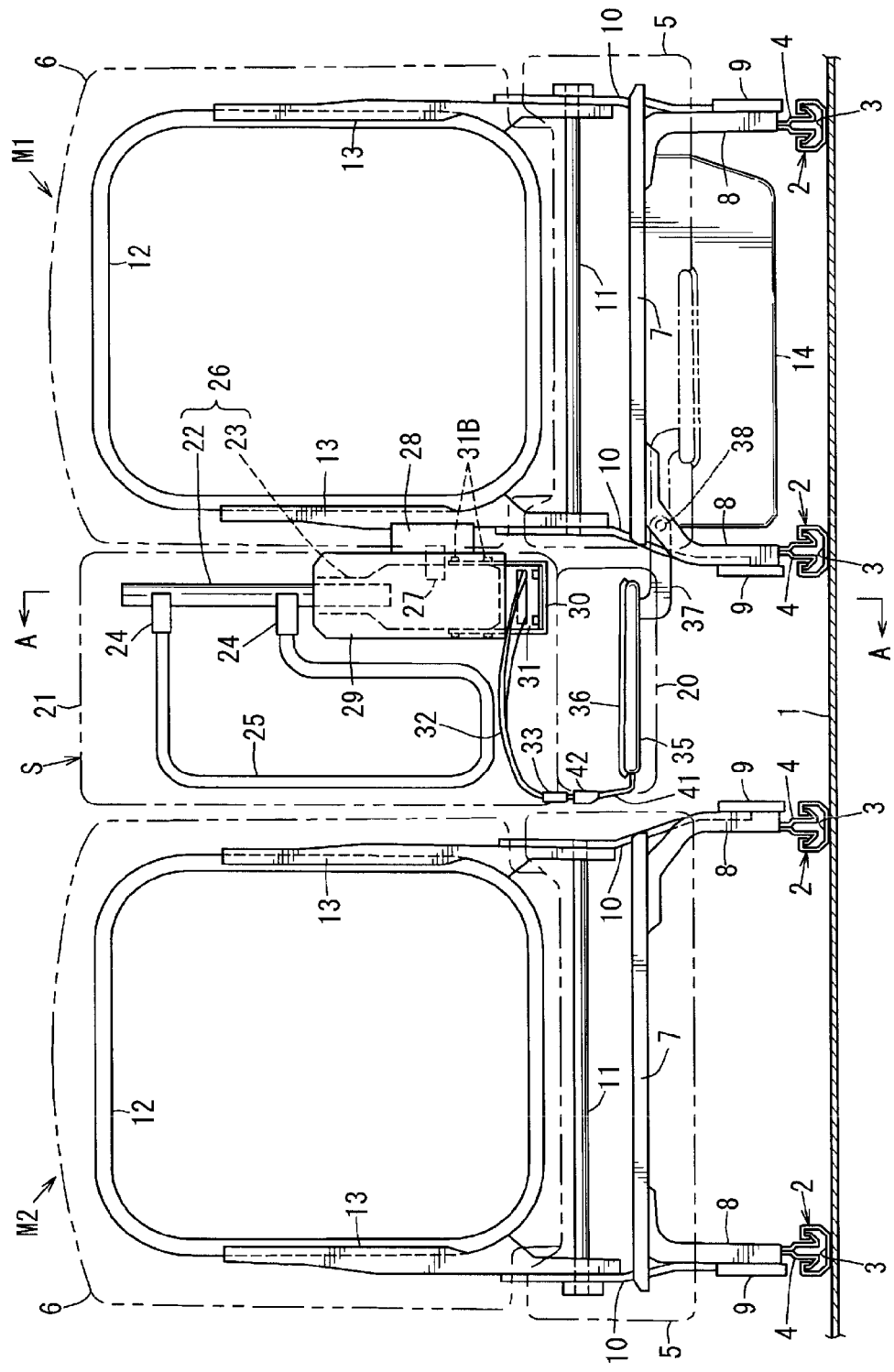
FIG. 1 is an elevation view showing a seat device for a vehicle according to a first embodiment of the present invention.

A first embodiment will be described specifically. In FIG. 1, a seat device for a vehicle according to the present embodiment comprises left and right main seats M1, M2 and a sub seat S which is positioned between the main seats M1, M2. Herein, this seat device for a vehicle is applicable to a second-row rear seat of the vehicle.

While the structure of the main seats M1, M2 will be described first, the left-side seat M1 will be described mainly because these two seats have substantially the same structure. The same reference characters are used for the right-side seat M2 as well.

A horizontal floor panel 1 is provided to form a bottom face of a vehicle compartment. Onto the floor panel is attached a pair of seat slide rails 2, 2 which extend in a vehicle longitudinal direction and away from each other in a vehicle width direction.

The above-described main seat M1 has a main-seat cushion 5 and a main-seat back 6 which projects upward from a rear end of the main-seat cushion 5 to support a back of a passenger seated in the main seat M1. A main-seat cushion frame 7 is arranged inside the main-seat cushion 5. Both sides of a lower portion of the main-seat cushion frame 7 are connected to upper rails 4 via L-shaped seat-cushion support bracket 8, 8. Seat-cushion frame sides 9, 9 which extend in the longitudinal direction are provided at outside portions of the seat-cushion support bracket 8, 8. Reclining support brackets 10, 10 which project upward toward a lower portion of the main-seat back 6 are attached to rear sides of the seat-cushion frame sides 9, 9. A reclining axis 11 which extends in the vehicle width direction is provided between the reclining support brackets 10, 10.

Meanwhile, the main-seat back 6 includes a rectangular main-seat back frame 12 and seat-back frame sides 13, 13 which are fixed to the both sides of this frame 12. The seat-back frame sides 13, 13 extend downward toward the reclining axis 11, and their lower extending portions of these frame sides 13, 13 are provided at the reclining axis 11. Thus, the reclining operation of the main-seat back 6 is available with a reclining device, not illustrated.

Further, a concave storage portion 14 to store a sub-seat cushion 20, which will be described later, is provided below the main-seat cushion frame 7. While this storage portion 14 is arranged only below the left-side main seat M1, not for the right-side main seat M2, other structures than the storage portion 14 are substantially the same in these main seats M1, M2.

According to the above-described structure, the left and right main seats M1, M2 can slide in the vehicle longitudinal direction along the seat slide tails 2, and each main-seat back 6 of these seats M1, M2 can recline around the reclining axis 11.

Herein, the above-described sub seat S is supported at one of the main seats M1, M2, at the left-side seat M1 according to the present embodiment. This sub seat S has a sub-seat cushion 20 and a sub-seat back 21. The sub-seat cushion 20 is storable in the above-described storage portion 14 below the main-seat cushion 5, and the sub-seat back 21 supports a back of a passenger seated in the sub seat S.

Figure 2:
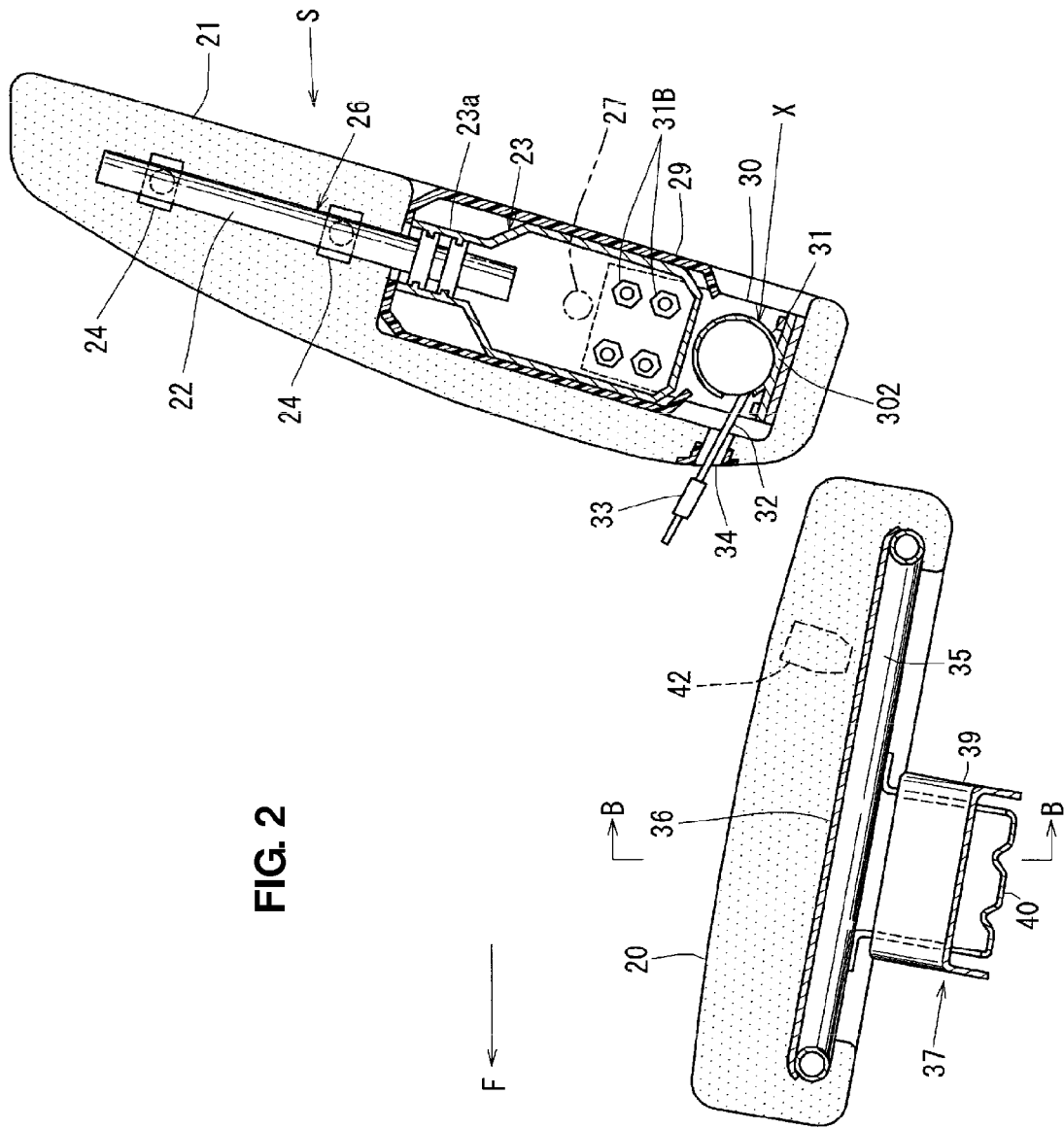
FIG. 2 is a sectional view taken along line A-A of FIG. 1.

A sub-seat back frame support portion 22 (hereinafter, referred to as a "frame support portion") which extends vertically is provided inside the sub-seat back 21 near the left-side main seat M1. This sub-seat back frame support portion 22 is made of a metal circular pipe for the purpose of its light weight and sufficient rigidity. A drum-shaped attachment portion 23 is provided at a lower extension of the frame support portion 22. This attachment portion 23 supports the frame support portion 22 at the main seat M1, and as shown in FIG. 2 (a perspective view taken along line A-A of FIG. 1), is formed in a hollow drum shape. An upper-end neck portion 23a of the attachment portion 23 supports the frame support portion 22 so that the frame support portion 22 can rotate.

Further, a sub-seat back frame 25 is attached to the above-described frame support portion 22 with attachments 24, 24. The sub-seat back frame 25 is made of a metal circular pipe for its light weight and sufficient rigidity.

Figure 3:
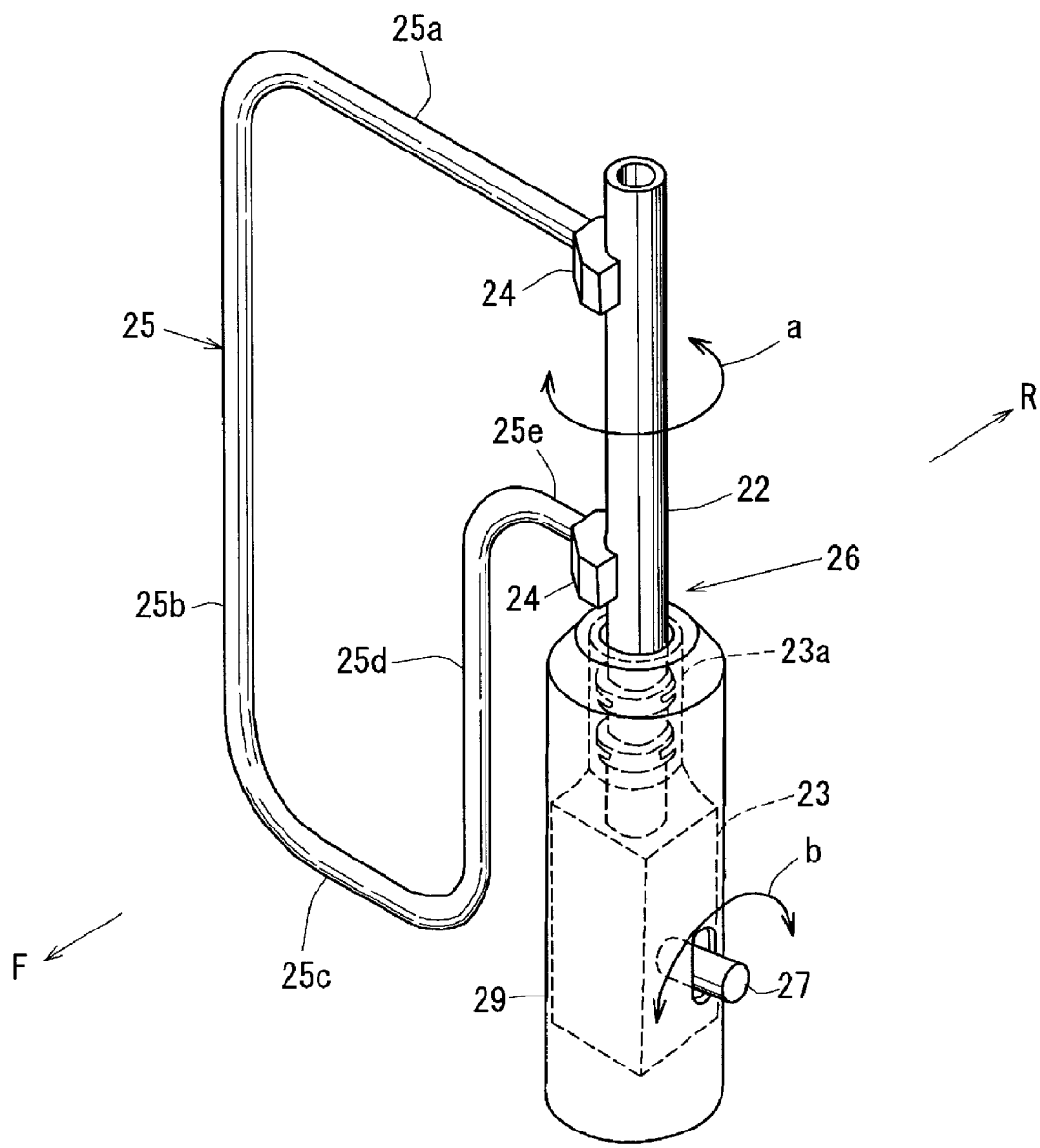
FIG. 3 is a perspective view showing a sub-seat back frame and a sub-seat back support member.

The sub-seat back frame 25, as shown in FIG. 3, comprises an upper piece 25a which extends from the upper attachment 24 toward the right, a right piece 25b which extends vertically from a right end of the upper piece 25a, a lower piece 25c which extends from a lower end of the right piece 25b toward the left, a left piece 25d which extends upward from a left end of the lower piece to a position which corresponds to the lower attachment 24, and an attachment piece 25e which extends from an upper end of the left piece 25d toward the left and connects to the lower attachment 24.

Herein, the above-described frame support portion 22 and attachment portion 23 constitute a sub-seat back support member 26, which is stored inside the sub-seat back 21 in the elevation view of the vehicle so as to form part of the sub-seat back 21. This sub-seat back support member 26 supports the sub-seat back 21 so as to be foldable at the main-seat back 6. The attachment portion 23 of the sub-seat back support member 26 is supported at the seat-back frame side 13 inside the left-side main-seat back 6 via a rotational center axis 27 and a sub-seat fixing bracket 28.

The above-described sub-seat fixing bracket 28 is supported at the pair of seat-back frame sides 13, 13. The above-described sub-seat fixing bracket 28 is fixed to the right-side seat-back frame side 13, the above-described rotational center axis 27 is attached to the sub-seat fixing bracket 28, and the attachment portion 23 is rotatable in the vehicle longitudinal direction around the rotational center axis 27. Herein, an outer periphery of the attachment portion 23 is covered with a cover member 29.

Since the frame support portion 22 is supported at the upper neck portion 23a of the attachment portion 23 (see FIG. 2) so as to rotate as shown in the perspective view of FIG. 3, the frame support portion 22, sub-seat back frame 25, and sub-seat back 21 rotate together as shown by an arrow a of FIG. 3, so that the sub-seat back 21 is foldable at the main-seat back 6.

Further, since the attachment portion 23 (see FIG. 2) is supported so as to rotate around the rotational center axis 27, the sub-seat back support member 26 which is comprised of this attachment portion 23 and the frame support portion 22 rotate together with the sub-seat back frame 25 and the sub-seat back 21 as shown by an arrow b in FIG. 3. The sub-seat back 21 is configured to rotate in the vehicle longitudinal direction relative to the main-seat back 6.

As shown in FIGS. 1 and 2, a retractor 31 is attached below the attachment portion 23 via a bracket 30. This retractor 31 constitutes a seatbelt device X for the sub seat S and winds up a webbing 32 of the seatbelt device X. As shown in FIG. 2, the retractor 31 is attached firmly to the sub-seat support member 26 via the bracket 30 and bolts 31B, 31B, so that the bracket 30 can be prevented from moving by a load which the retractor 31 receives.

Further, a second bracket 302 which encloses the retractor 31 and fixes the retractor 31 to the bracket 30 is provided. By the second bracket 302 firmly fixed to the bracket 30, the move of the retractor 31 receiving the load of the vehicle longitudinal direction when the webbing 32 is locked is controllable.

Herein, the bracket 30 is fixed with the bolts 31B, 31B in the above-described embodiment. This is just because using the bolts 31B, 31B may have an advantage that the bracket 30 and the retractor 31 can be used commonly even in case the size of the seats is different. Accordingly, another connection means for fixing of the bracket 30, such as welding, may be applied in place of the bolts 31B.

A tip tongue 33 is fixed to a tip of the webbing 32. Further, a webbing outlet 34 from which the webbing 32 is withdrawn is formed at a specified portion (a left lower portion according to the present embodiment) of the sub-seat back 21 which corresponds to the retractor 31.

Figure 4:
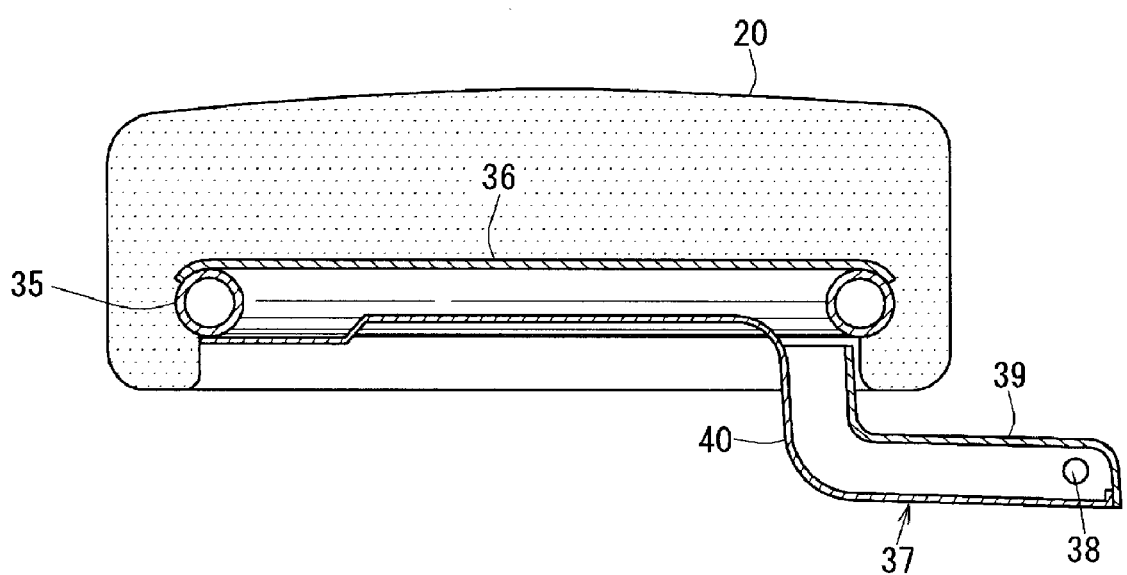
FIG. 4 is an elevation view showing a support structure of a sub-seat cushion.

Meanwhile, the sub-seat cushion 20 of the sub seat S is constituted as shown in FIGS. 2 and 4. As shown in the side view of FIG. 2 and the elevation view of FIG. 4, the sub-seat cushion 20 includes a sub-seat cushion frame 35 which is made of a metal circular pipe and has a rectangular shape, and a plate 36 which is fixed to an upper portion of the sub-seat cushion frame 35 and has a flat plate shape in it.

The sub-seat cushion frame 35 is, as shown in FIGS. 1, 2 and 4, attached to a support portion 38 which is provided on the side of the seat-cushion support bracket 8 of the main seat M1 via a support bracket 37. These elements 35, 36 and 37 take a use state shown by solid lines in FIG. 1 and a storage state shown by broken lines in FIG. 1 in which they are positioned inside the storage portion 14. In case the elements 35, 36 and 37 are in the use state, the sub-seat cushion 20 takes its sitting position. In case the elements 35, 36 and 37 are in the storage state, the sub-seat back 21 is folded so that a walk-through mode is made in which a walk-in space can be formed between the second-row seat and the third-row seat. Herein, the above-described support bracket 37 has a specified width in the vehicle longitudinal direction as shown in FIG. 2, and is comprised of two members of a bracket outer 39 and a bracket inner 40 so as to support the sub-seat cushion 20 with the sufficient support rigidity.

Further, as shown in FIG. 1, a buckle 42 is attached to the sub-seat cushion frame 35 via a buckle connection portion 41. This buckle 42 detachably holds the tip tongue 33 of the webbing, and is provided on a side of the sub-seat cushion 20 which is opposite to a disposition side of the left-side main seat M1 in the vehicle width direction, that is, on the right side of the sub-seat cushion 20. In other words, since the retractor 31 is provided on the left side of the lower portion of the sub-seat cushion 21, the buckle 42 is provided on the opposite side to this retractor 31.

When the tip tongue 33 fixed to the tip end portion of the webbing 32 is inserted into and locked by the buckle 42 provided on the side of the sub-seat cushion 20 as shown in FIG. 1, the passenger seated in the sub seat S can be properly restrained by the webbing 32 withdrawn from the retractor 31 at two points. In the figures, an arrow F shows the front direction of the vehicle.

As described above, the seat device for a vehicle according to the embodiment shown in FIGS. 1-4 comprises the main seat M1 having the main-seat cushion 5 and the main-seat back 6, the main-seat back 6 projecting upward from the rear end of the main-seat cushion 5 to support the back of the passenger seated in the main seat M1, the sub seat S having the sub-seat cushion 20 and the sub-seat back 21, the sub-seat cushion 20 supported at the main seat M1 so as to be storable at the position below the main-seat cushion 5, the sub-seat back 21 supporting the back of the passenger seated in the sub seat S, the sub-seat back support member 26 to support the sub-seat back 21 at the main-seat back 6 so that the sub-seat back 21 is foldable at the main-seat back 6, and the seatbelt device X for the sub seat S, the seatbelt device X for the sub seat S comprising the retractor 31 to wind up the webbing 32 and the buckle 42 to detachably hold the tongue (see the tip tongue 33) fixed to the webbing 32, wherein the retractor 31 of the seatbelt device X for the sub seat S is attached to the sub-seat back support member 26, and the buckle 42 of the seatbelt device X for the sub seat S is provided on the side of the sub-seat cushion 20 which is opposite to the disposition side of the main seat M1 in the vehicle width direction (see FIGS. 1 and 2). Thereby, since the sub-seat cushion 20 is supported at the main seat M1 and the sub-seat back 21 is supported at the main-seat back M1, the sitting rigidity of the sub seat S can be endured and the comfortable sitting can be provided.

Further, since the retractor 31 of the seatbelt device X for the sub seat S is attached to the sub-seat back support member 26, the sufficient support rigidity of the retractor 31 can be ensured. Moreover, the passenger seated in the sub seat S can be properly restrained by the webbing 32 (at the two points according to the present embodiment) when the tongue (see the tip tongue 33) fixed to the webbing 32 is held by the buckle 42 of the sub-seat cushion 20.

Moreover, the sub-seat back support member 26 is supported at the seat-back frame 12 of the main seat M1 (see FIG. 1). Thereby, the support rigidity of the retractor 31 attached to the sub-seat back support member 26 can be further improved, so that the crash impact from the vehicle collision can be received properly.

Further, the buckle 42 is provided at the sub-seat cushion 20 of the sub seat S. Thereby, the buckle 42 can be stored along with the sub-seat cushion 20 below the main-seat cushion 5, so the proper appearance in the storage state can be provided.

Embodiment 2

Figure 5:
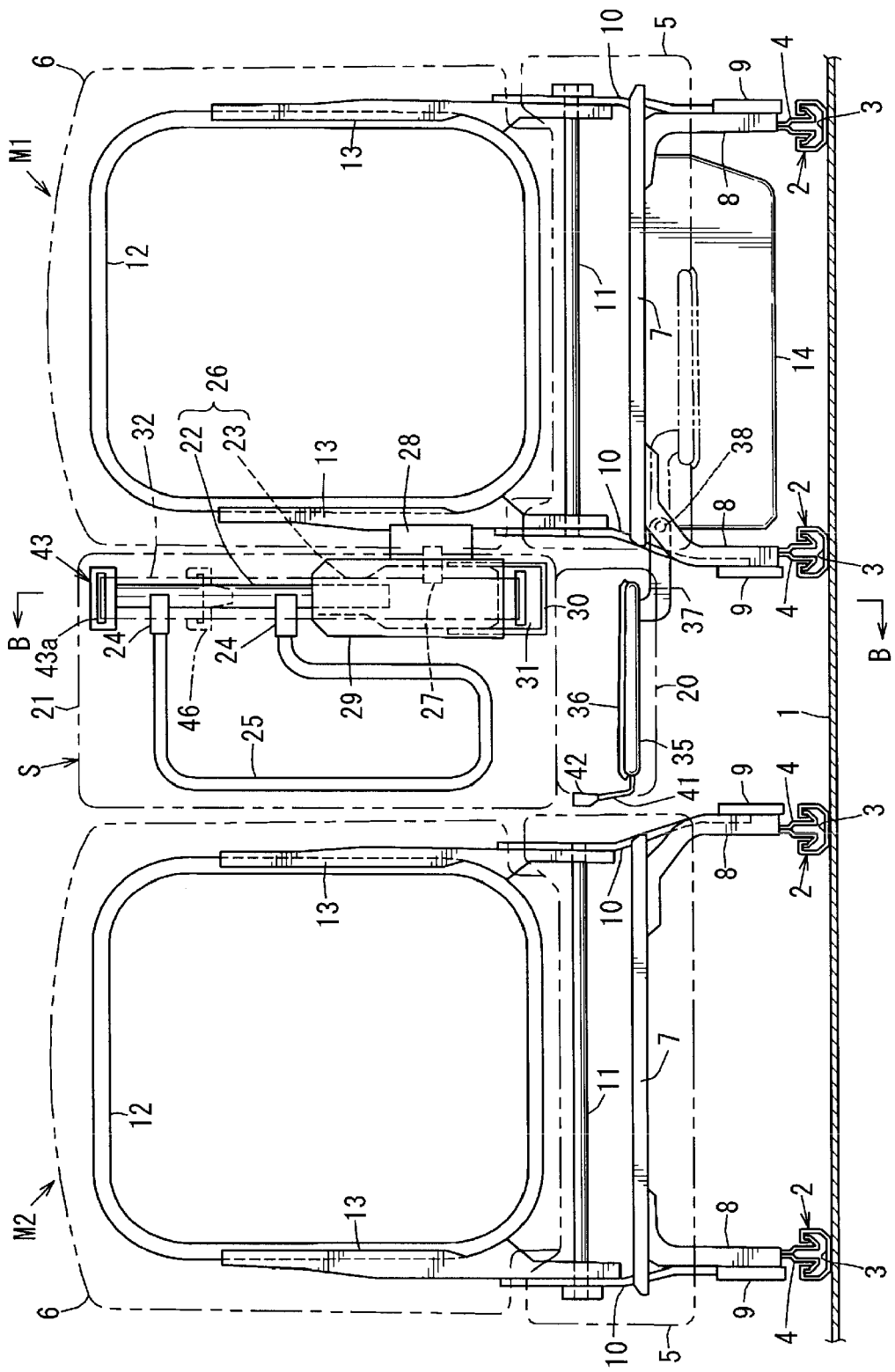
FIG. 5 is an elevation view showing a seat device for a vehicle according to a second embodiment.
Figure 6:
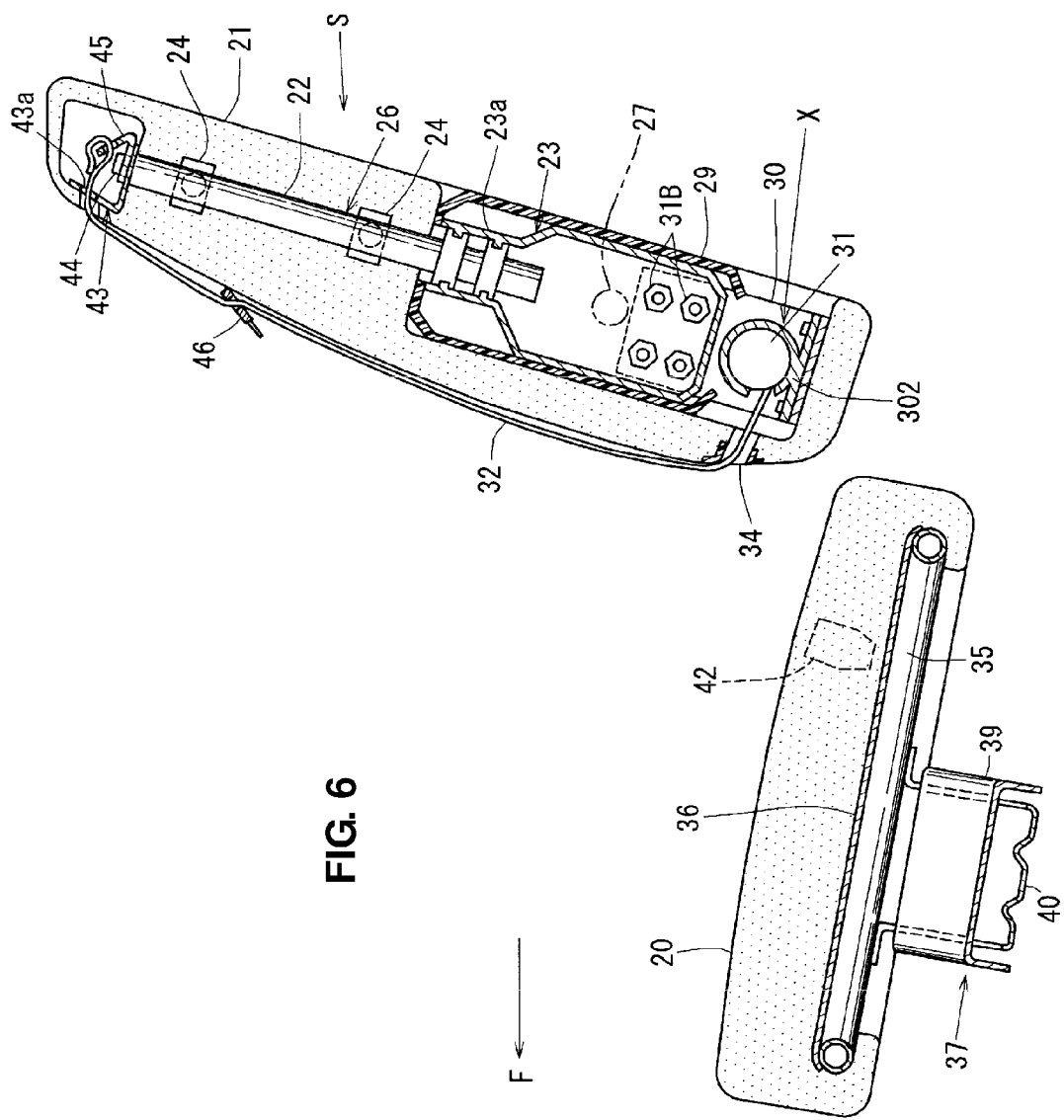
FIG. 6 is a sectional view taken along line B-B of FIG. 5.
Figure 7:
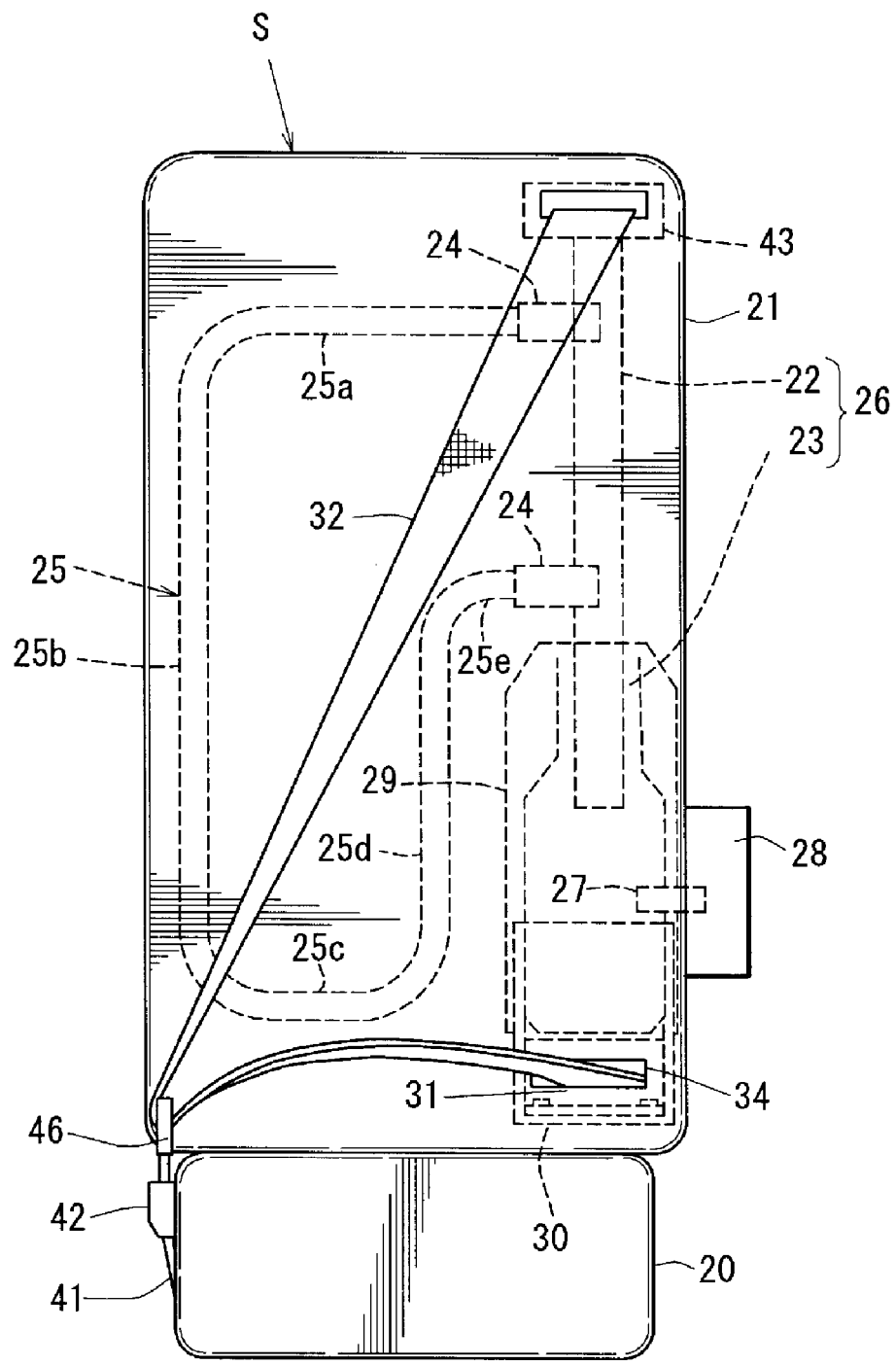
FIG. 7 is an elevation view showing a three-point type of passenger restraint state by webbing.

FIGS. 5, 6 and 7 show a seat device for a vehicle according to a second embodiment. FIG. 5 is an elevation view of a whole part of that, FIG. 6 is a perspective view taken along line B-B of FIG. 5, and FIG. 7 is an explanatory view of a passenger restraint with the webbing 32. According to the present embodiment, as shown in FIG. 6 especially, a shoulder anchor 43 to guide a middle portion of the webbing 32 (specifically, a middle portion of the webbing 32 near the tip of the webbing) of the seatbelt device X for the sub seat S is provided, and this shoulder anchor 43 is attached to an upper portion of the sub-seat back support member 26 which is positioned above the retractor 31.

In the present embodiment, as shown in FIG. 6, the above-described shoulder anchor 43 and an anchor bracket 45 are fixed together to an upper end portion of the frame support portion 22 constituting the sub-seat back support member 26 with a bolt 44. Herein, the height position of the shoulder anchor 43 corresponds to a shoulder of the passenger seated in the sub seat S.

In this case, a screw hole (not illustrated) is formed at an inner periphery of the upper end portion of the frame support portion 22, and the above-described bolt 44 is fastened into the screw hole. Thereby, the shoulder anchor 43 and the anchor bracket 45 are fixed together. Further, the webbing 32 is guided upward via the face of the sub-seat back 21 and then fixed to the anchor bracket 45 through via a guide hole 43a (see FIGS. 5 and 6) which is formed at the shoulder anchor 43. Moreover, a middle tongue 46 which is detachably held by the buckle 42 is movably provided at the middle portion of the webbing 32.

When the middle tongue 46 at the middle portion of the webbing 32 shown in FIG. 5 is inserted into and locked by the buckle 42 provided on the side of the sub-seat cushion 20, a shoulder belt portion is formed at the webbing 32 between the shoulder anchor 43 and the buckle 42, and a lap belt portion is formed at the webbing 32 between the buckle 42 and the retractor 31 as shown in FIG. 7. Thus, the passenger seated in the sub seat S is restrained at three points.

As described above, according to the embodiment shown in FIGS. 5, 6 and 7, the shoulder anchor 43 which guides the middle portion of the webbing 32 of the seatbelt device X for the sub seat S is attached to the upper portion of the sub-seat back support member 26 which is positioned above the retractor 31 (see FIG. 6). Thereby, since the middle portion of the webbing 32 is guided by the shoulder anchor 43 which is positioned above the retractor 31, the passenger seated in the sub seat S can be restrained by the three-point type of seatbelt properly without hurting any seat arrangement when the tongue (see the middle tongue 46) fixed to the webbing 32 is held by the buckle 42 of the sub-seat cushion 20 as shown in FIG. 7. Further, by providing the retractor 31 at the position below the shoulder anchor 43, the retractor 31 having some weight can be properly away from the upper half body of the passenger, so that the safety of the passenger seated in the sub seat can be improved effectively.

The structures, operations and effects of the other elements of the present embodiment shown in FIGS. 5, 6 and 7 are substantially the same as those of the previous embodiment, so the same reference characters are used for the same elements, specific descriptions of which are omitted here.

Embodiment 3

Figure 8:
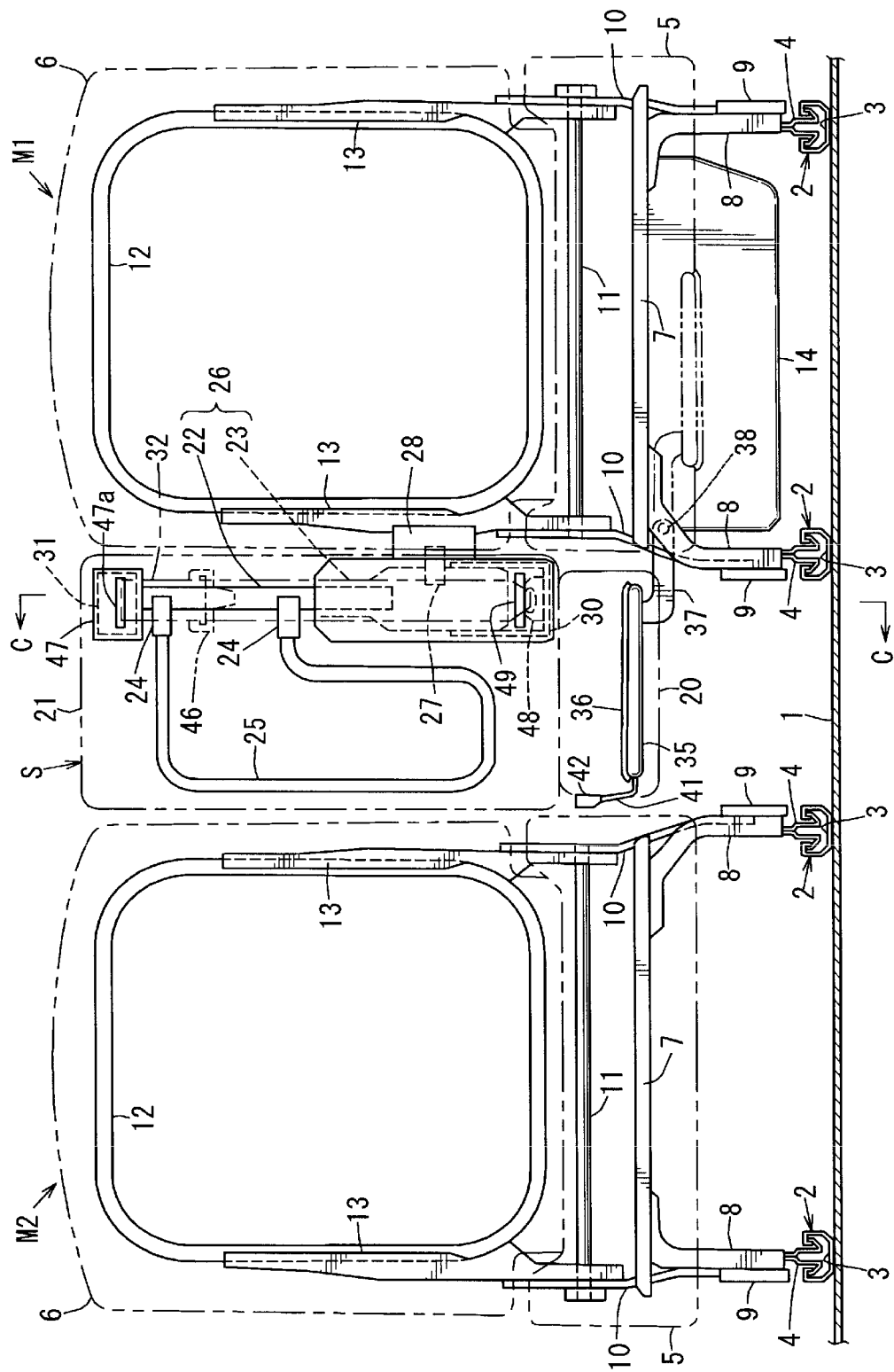
FIG. 8 is an elevation view showing a seat device for a vehicle according to a third embodiment.
Figure 9:
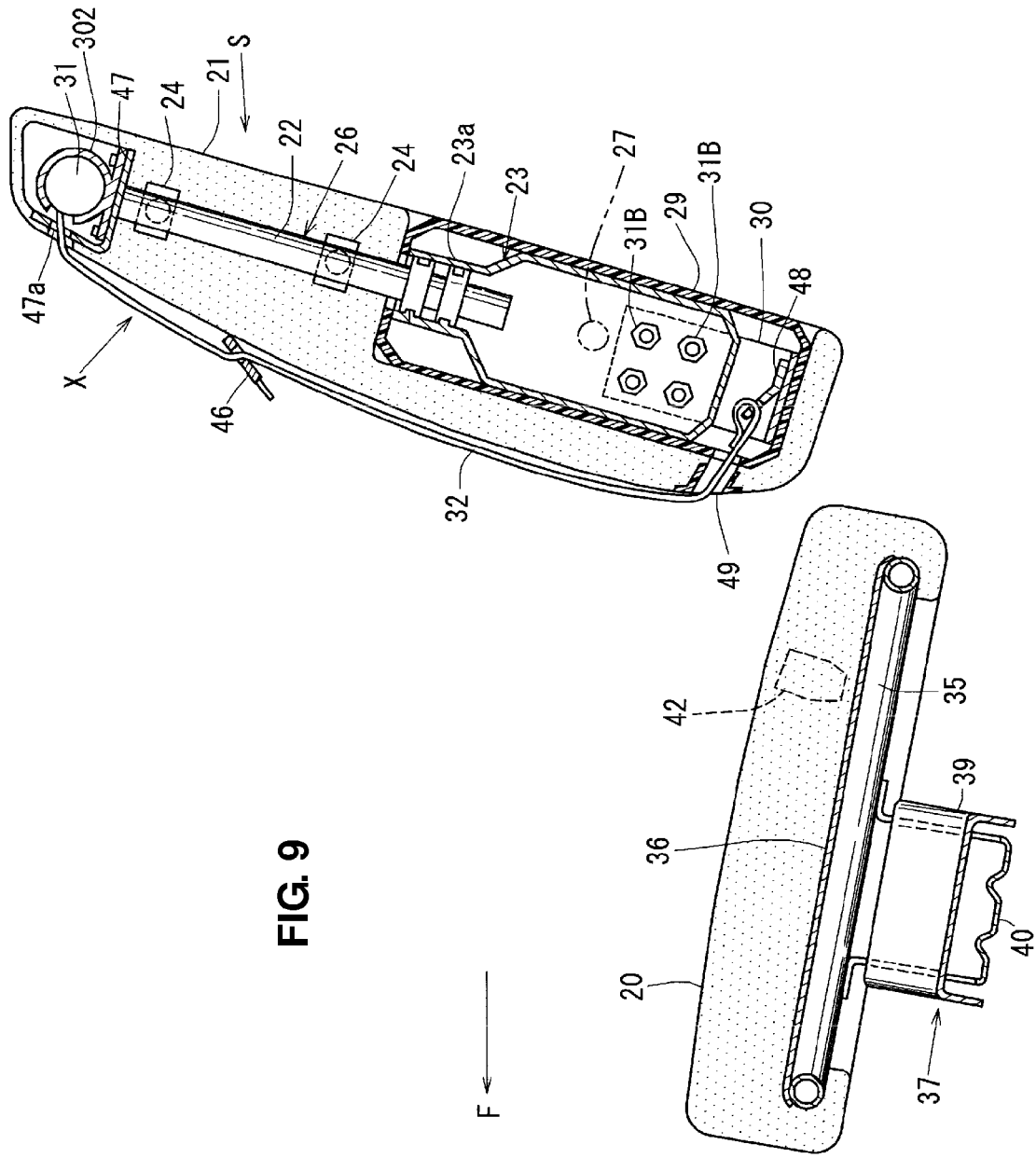
FIG. 9 is a sectional view taken along line C-C of FIG. 8.
Figure 10:
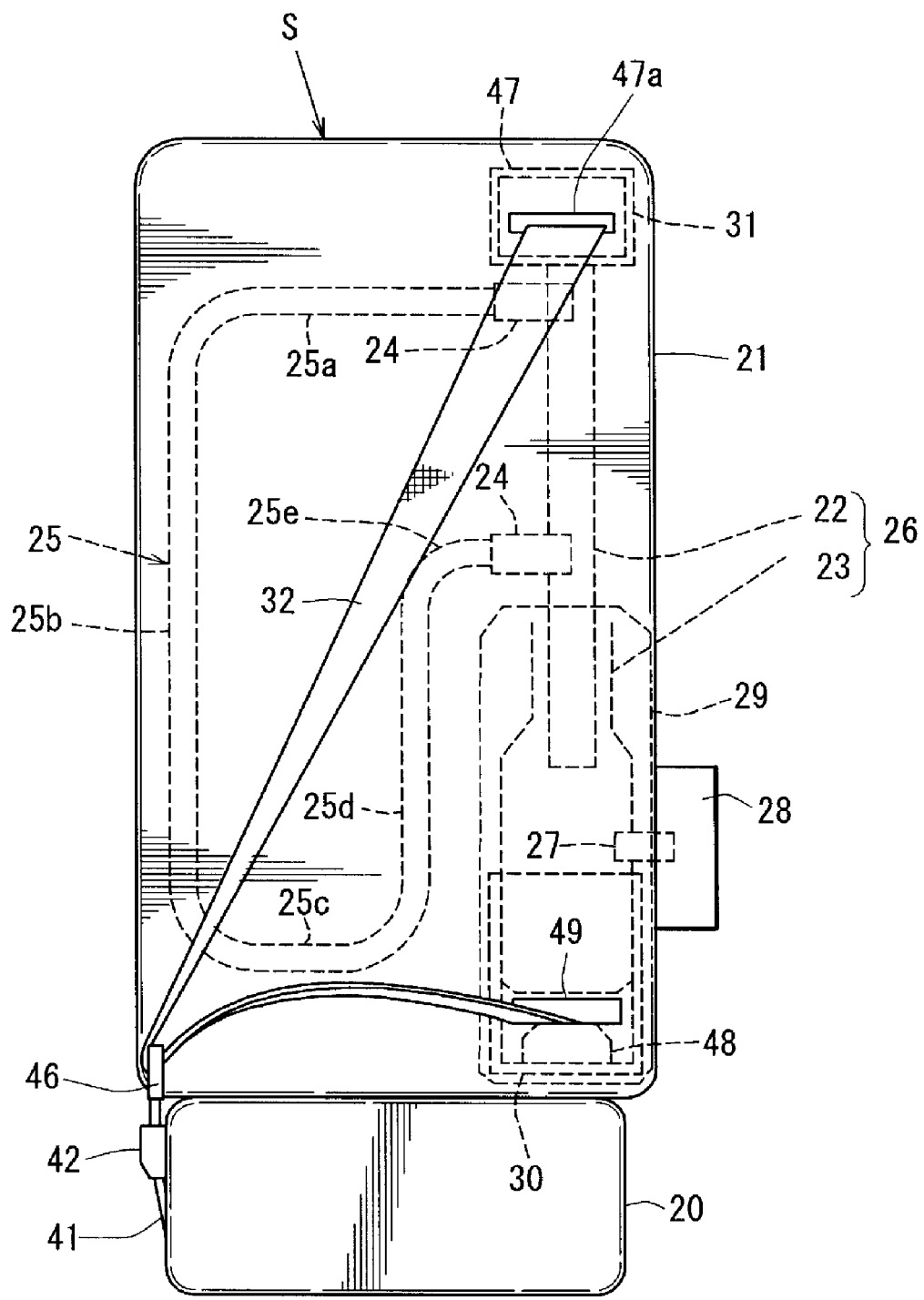
FIG. 10 is an elevation view showing a three-point type of passenger restraint state by webbing.

FIGS. 8, 9 and 10 show a seat device for a vehicle according to a third embodiment. FIG. 8 is an elevation view of the whole part of that, FIG. 9 is a perspective view taken along line C-C of FIG. 9, and FIG. 10 is an explanatory view of a passenger restraint with the webbing 32. While the retractor 31 is provided at the bracket 30 at the lower portion of the sub-seat back 21 in the second embodiment, the retractor 31 is provided at the upper portion of the sub-seat back support member 26, specifically at the height position which corresponds to the passenger's shoulder.

That is, as shown in FIG. 9, the retractor 31 is provided at the upper end of the frame support portion 22 of the sub-seat back support member 26 which corresponds to the height position of the shoulder of the passenger seated in the sub seat S, the lower end portion of the webbing 32 which extends from the retractor 31 is fixed to the sub-seat back support member 26 at a position which corresponds to the height of the sub-seat cushion 20, and the middle tongue 46 as the tongue which is detachably held by the buckle 42 is movably provided at the middle portion of the webbing 32.

Specifically, a bracket 47 as a shoulder anchor is attached to the upper end of the frame support member 22 of the sub-seat back support member 26, the retractor 31 is provided at this bracket 47, and the webbing 32 from the retractor 31 is guided from an guide hole 47a of the bracket 47 to the face of the sub-seat back 21.

Further, an anchor bracket 48 which fixes the lower end portion of the webbing 32 is fixed to the above-described bracket 30, and a webbing guide hole 49 is provided at a specified portion which faces to the anchor bracket 48 in the longitudinal direction. Herein, the webbing 32 which extends downward along the face of the sub-seat back 21 is guided from the webbing guide hole 49 to the position of the anchor bracket 48, and the lower end portion of the webbing 32 is fixed to the anchor bracket 48.

When the middle tongue 46 at the webbing 32 shown in FIG. 8 is inserted into and locked by the buckle 42 provided on the side of the sub-seat cushion 20, a shoulder belt portion is formed at the webbing 32 between the bracket 47 as a shoulder anchor and the buckle 42, and a lap belt portion is formed at the webbing 32 between the buckle 42 and the anchor bracket 48 as shown in FIG. 10. Thus, the passenger seated in the sub seat S is restrained at three points. That is, the passenger seated in the center of the rear seat can be restrained with the three-point type of seatbelt structure.

As described above, according to the embodiment shown in FIGS. 8-10, the retractor 31 is provided at the upper portion of the sub-seat back support member 26 (specifically, the upper end of the frame support member 22), the end portion of the webbing 32 which extends from the retractor 31 is fixed to the sub-seat back support member 26 (specifically, the bracket 30 fixed to the attachment portion 23 of this member 26) at the height position which corresponds to the sub-seat cushion 20, and the tongue (see the middle tongue 46) detachably held by the buckle 42 is provided movably at the middle portion of the webbing 32 (see FIG. 9).

Thereby, since the end portion (see the lower end portion) of the webbing 32 is fixed to the sub-seat back support member 26 and the tongue (see the middle tongue 46) is provided movably at the middle portion of the webbing 32, the passenger seated in the sub seat S can be restrained by the three-point type of seatbelt properly when the tongue (middle tongue 46) is held by the buckle 42. Further, since the retractor 31 is provided at the height position which corresponds to the passenger's shoulder, any too-much longitudinal move of the upper half body of the passenger which may be caused by the vehicle collision can be properly prevented by the lock mechanism of the webbing 32 by the retractor 31, so that the safety of the passenger seated in the sub seat can be further improved.

Further, since the retractor 31 is provided at the sub-seat back support member 26 (specifically, see the upper end of the frame support portion 22), the proper support rigidity of the retractor 31 can be ensured.

The structures, operations and effects of the other elements of the present embodiment shown in FIGS. 8-10 are substantially the same as those of the previous embodiments, so the same reference characters are used for the same elements, specific descriptions of which are omitted here.

Embodiment 4

Figure 11:
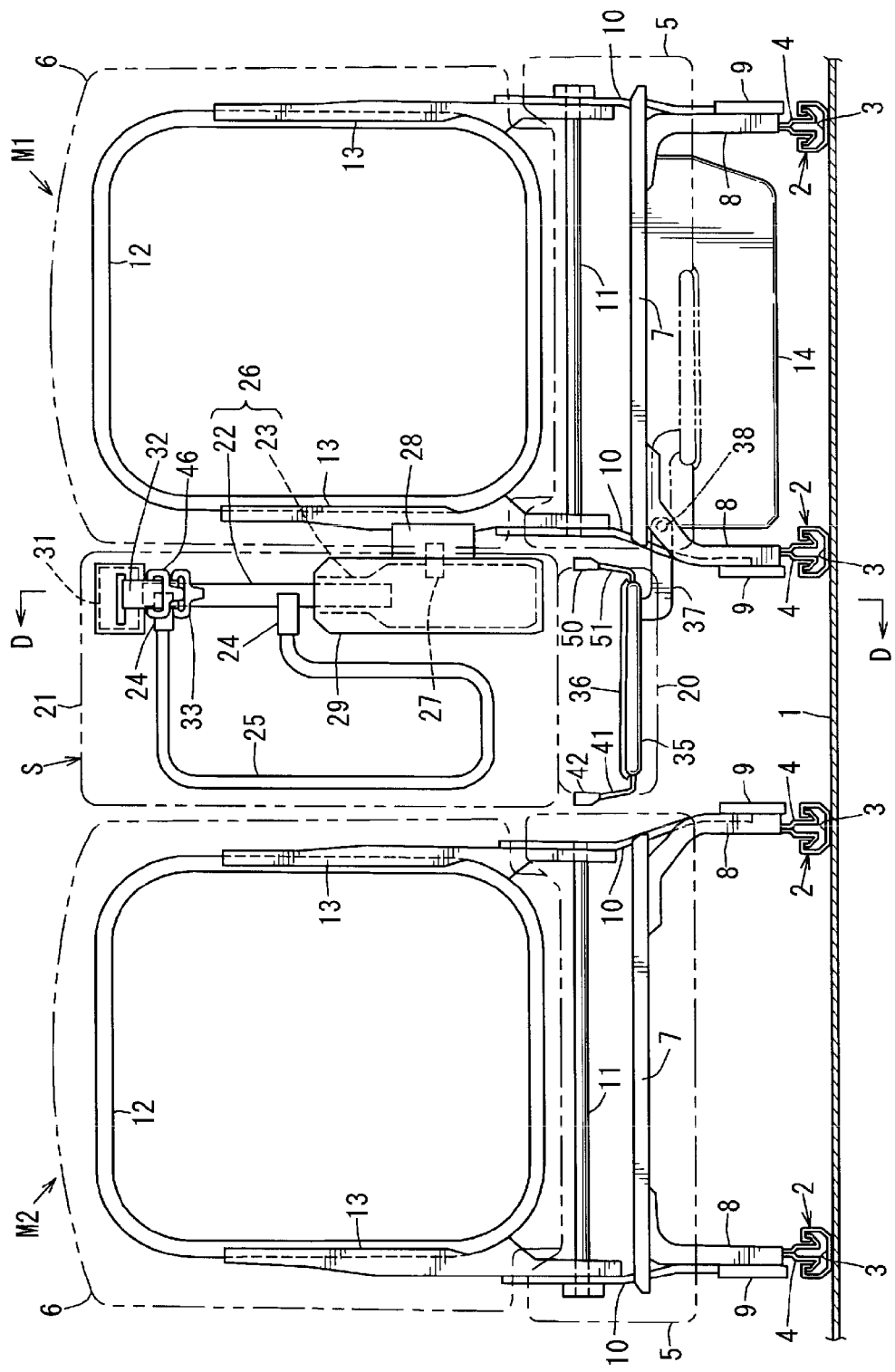
FIG. 11 is an elevation view showing a seat device for a vehicle according to a fourth embodiment.
Figure 12:
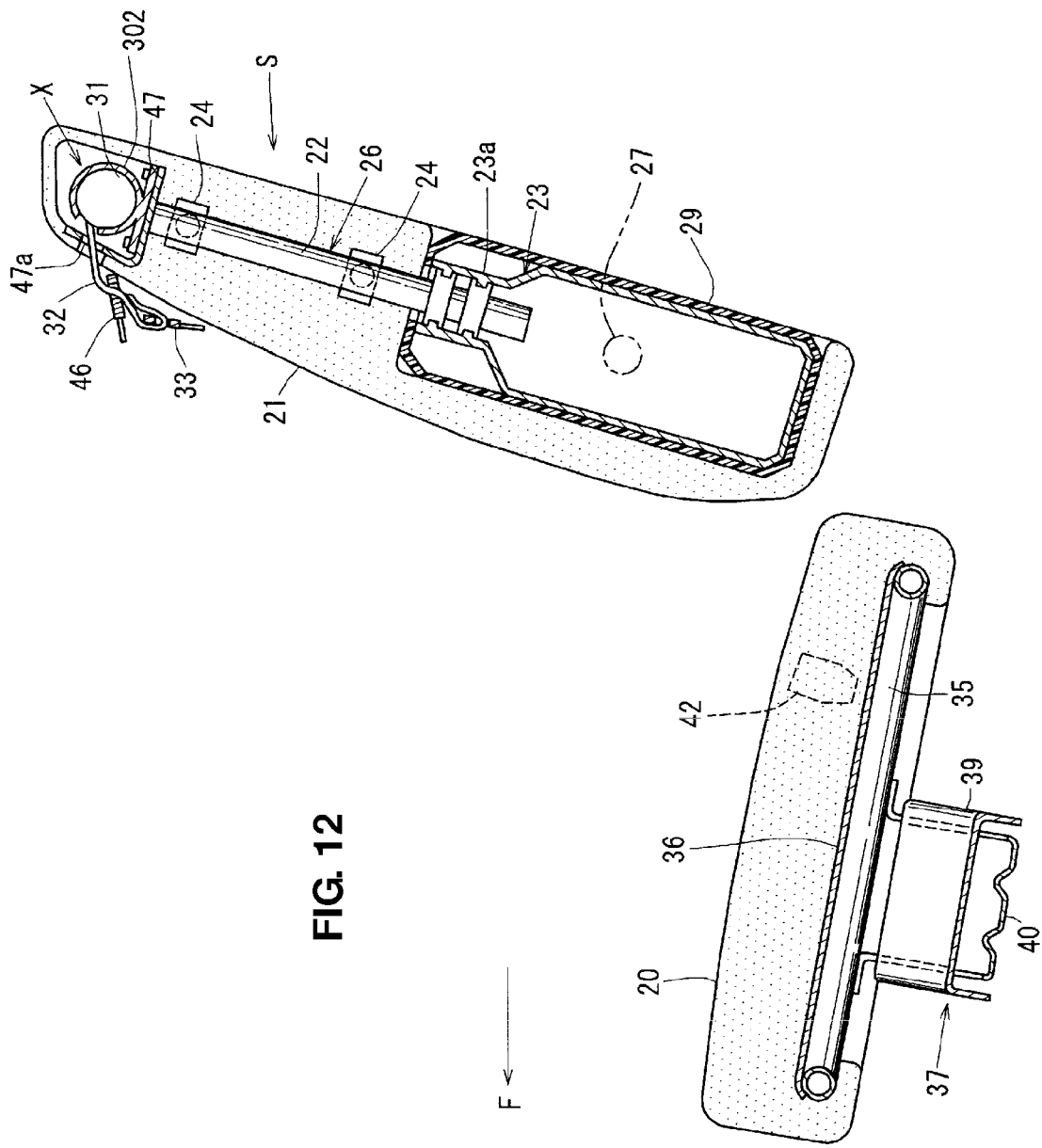
FIG. 12 is a sectional view taken along line D-D of FIG. 11.
Figure 13:
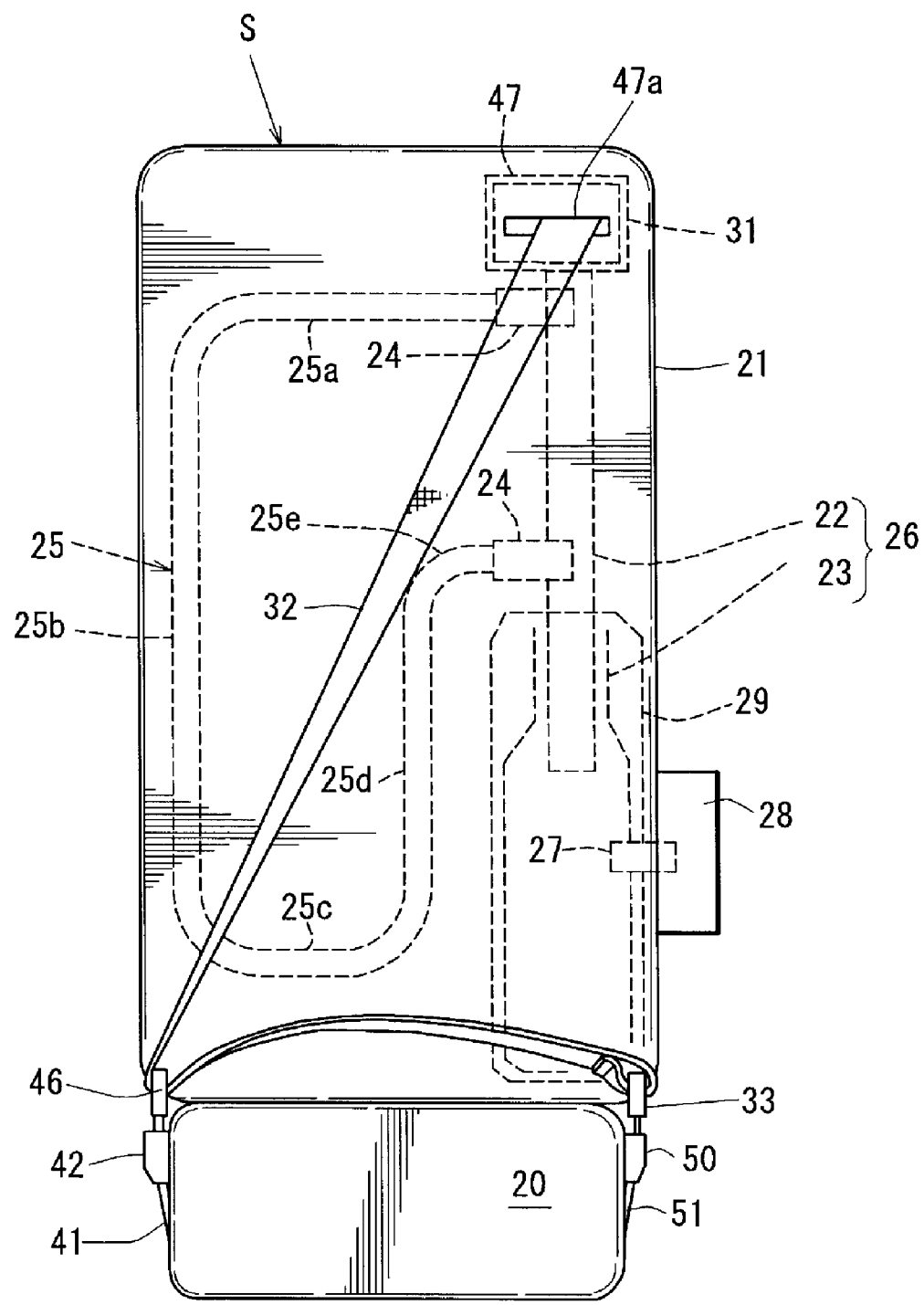
FIG. 13 is an elevation view showing a three-point type of passenger restraint state by webbing.

FIGS. 11, 12 and 13 show a seat device for a vehicle according to a fourth embodiment. FIG. 11 is an elevation view of the whole part of that, FIG. 12 is a perspective view taken along line D-D of FIG. 11, and FIG. 13 is an explanatory view of a passenger restraint with the webbing 32. While the webbing 32 is exposed so as to extend vertically on the face of the sub-seat back 21 when the webbing 32 is not used the retractor 31 in the second and third embodiments, this exposure does not exist in the fourth embodiment.

That is, as show in the elevation view of FIG. 11, a pair of buckles 42, 50 is provided at the sub-seat cushion frame 35 of the sub-seat cushion 20 via buckle connection portions 41, 51.

Further, as shown in FIG. 12, the retractor 31 is provided at the upper portion of the sub-seat back support member 26, specifically at the height position which corresponds to the shoulder of the passenger seated in the sub seat S. That is, the bracket 47 as a shoulder anchor is attached to the upper end of the frame support member 22 of the sub-seat back support member 26, and the retractor 31 is provided at this bracket 47. The webbing 32 from the retractor 31 is guided from the guide hole 47a of the bracket 47 to the face of the sub-seat back 21.

The tip tongue 33 as a fixed tongue which is detachably held by the buckle 50 (the left-side buckle according to the present embodiment) is provided at the withdrawal tip of the webbing 32, and the middle tongue 46 as a movable tongue which is detachably held by the other buckle 42 (the right-side buckle according to the present embodiment) is movably provided at the middle portion of the webbing 32. Thus, the seatbelt device X is constituted.

In case the passenger seated in the center of the rear seat is restrained by the seatbelt device X, when the tip tongue 33 shown in FIG. 11 is inserted into and locked by the buckle 50 positioned on the left side of the sub-seat cushion 20 first and then the middle tongue 46 is inserted into and locked by the buckle 42 positioned on the right side of the sub-seat cushion 20, the shoulder belt portion of the webbing 32 is formed between the bracket 47 as the shoulder anchor and the buckle 42 and the lap belt portion of the webbing 32 is formed between the both-side buckles 50, 42 as shown in FIG. 13. Thus, the passenger seated in the sub seat S (the passenger seated in the center of the rear seat) can be restrained with the three-point type of seatbelt structure. Further, in case the webbing is not used, the webbing 32 can be perfectly wound up by and stored in the retractor 32 as shown in FIG. 11, so that the webbing 32 can be prevented from being exposed on the face of the seat.

As described above, according to the embodiment shown in FIGS. 11-13, the retractor 31 is provided at the upper portion of the sub-seat back support member 26, the movable tongue (see the middle tongue 46) is provided movably at the middle portion of the webbing 32 detachably held by the buckle 42, and the fixed tongue (see the tip tongue 33) detachably held by the other buckle 50 which is provided on the other side of the sub-seat cushion 5 which is opposite to the disposition side of the buckle 42 is fixed to the end portion of the webbing 32 (see FIGS. 11-13).

Thereby, the passenger seated in the sub seat can be restrained by the three-point type of seatbelt properly when the fixed tongue (see the tip tongue 33) fixed to the end portion of the webbing 32 is held by the buckle 50 and then the movable tongue (see the middle tongue 46) is held by the other buckle 42. Accordingly, the safety of the passenger seated in the sub seat can be improved. Further, since the so-called double tongue constitution is provided, the webbing 32 can be perfectly wound up by and stored in the retractor 31 in a seat arranging, so that the proper seat arrangement can be obtained. Herein, the other buckle 50 may be provided on the opposite side of the sub-seat cushion 20 to the buckle 42 by being attached to the sub-seat back support member 26 or the main seat M1, not limited to the sub-seat cushion 20, so as to ensure the proper support rigidity.

Moreover, since the retractor 31 is provided at the sub-seat back support member 26, the proper support rigidity of the retractor 31 can be ensured.

The structures, operations and effects of the other elements of the present embodiment shown in FIGS. 11-13 are substantially the same as those of the previous embodiments, so the same reference characters are used for the same elements, specific descriptions of which are omitted here.

The present should not be limited to the above-described embodiments, and any other modifications or improvements can be applied within the scope of a sprit of the present invention.

For example, while the sub seat S is supported at the left-side main seat M1 in the above-described embodiments, it may be supported at the right-side main seat M2. Further, the seat device for a vehicle described above should not be limited to the second-row rear seat.

What is claimed is:
1. A seat device for a vehicle, comprising:
a main seat having a main-seat cushion and a main-seat back, the main-seat back projecting upward from a rear end of the main-seat cushion to support a back of a passenger seated in the main seat;

a sub seat having a sub-seat cushion and a sub-seat back, the sub-seat cushion being connected to the main seat via a support linkage which enables the sub-seat cushion to be stored below the main-seat cushion, the sub-seat back supporting a back of a passenger seated in the sub seat, the sub-seat back comprising a sub-seat back frame and a sub-seat back support member, the sub-seat back support member being configured to connect the sub-seat back frame to the main seat such that the sub-seat back frame of the sub-seat back is at least laterally rotatable relative to the main seat, whereby the sub-seat back is foldable at the main-seat back; and a seatbelt device for a sub seat, the seatbelt device for a sub seat comprising a retractor to wind up a webbing and a buckle to detachably hold a tongue provided at the webbing, wherein said retractor of the seatbelt device for a sub seat is attached to said sub-seat back support member, and said buckle of the seatbelt device for a sub seat is attached to the sub-seat cushion on an opposite side to a disposition side of the main seat in a vehicle width direction.

2. The seat device for a vehicle of claim 1, wherein a shoulder anchor to guide a middle portion of the webbing of said seatbelt device for a sub seat is attached to an upper portion of said sub-seat back support member which is positioned above said retractor of the seatbelt device for a sub seat.

3. The seat device for a vehicle of claim 1, wherein said retractor of the seatbelt device for a sub seat is provided at an upper portion of said sub-seat back support member, an end portion of the webbing extending from the retractor is fixed to said sub-seat back support member at a height position which corresponds to said sub-seat cushion, and said tongue detachably held by the buckle is provided movably at a middle portion of the webbing of the seatbelt device for a sub seat.

4. The seat device for a vehicle of claim 1, wherein said retractor of the seatbelt device for a sub seat is provided at an upper portion of said sub-seat back support member, said tongue is provided movably at a middle portion of the webbing detachably held by the buckle of the seatbelt device for a sub seat, and a fixed tongue detachably held by another buckle which is provided on the other side of the sub-seat cushion which is opposite to a disposition side of said buckle is fixed to an end portion of the webbing.

5. The seat device for a vehicle of claim 1, wherein said buckle is provided at said sub-seat cushion of the sub seat.

6. The seat device for a vehicle of claim 1, wherein said sub-seat back support member is configured to connect said sub-seat back frame to a main-seat back frame of said main seat.

7. The seat device for a vehicle of claim 1, wherein said the sub-seat back support member comprises a rod-shaped member connected to said sub-seat back frame of the sub-seat back and a rotatably-supporting member supporting the rod-shaped member rotatably around a rod-axis of the rod-shaped member, and said retractor of the seatbelt device for a sub seat is attached to said rotatably-supporting member of the sub-seat back support member.

* * * * *